United States Patent
Zhang et al.

(10) Patent No.: US 9,244,928 B1
(45) Date of Patent: Jan. 26, 2016

(54) SYSTEMS AND METHODS FOR DIRECTORY SNAPSHOT

(71) Applicant: CA, Inc., Islandia, NY (US)

(72) Inventors: Haiyang Zhang, Beijing (CN); Guoxian Shang, Beijing (CN); Shaorong Li, Beijing (CN); Guodong Li, Beijing (CN)

(73) Assignee: CA, Inc., Islandia, NY (US)

( * ) Notice: Subject to any disclaimer, the term of this patent is extended or adjusted under 35 U.S.C. 154(b) by 499 days.

(21) Appl. No.: 13/786,228

(22) Filed: Mar. 5, 2013

(51) Int. Cl.
*G06F 17/30* (2006.01)

(52) U.S. Cl.
CPC ............................ *G06F 17/30088* (2013.01)

(58) Field of Classification Search
CPC .............................................. G06F 17/30088
USPC ................................................. 707/610, 800
See application file for complete search history.

(56) References Cited

U.S. PATENT DOCUMENTS

| | | | |
|---|---|---|---|
| 7,908,302 B1 * | 3/2011 | Nagaralu | G06F 17/30067 707/821 |
| 2007/0073989 A1 * | 3/2007 | Sharma | G06F 1/3225 711/165 |
| 2015/0234712 A1 * | 8/2015 | Fei | G06F 11/1446 707/639 |

OTHER PUBLICATIONS

Article entitled "Administration Guide: CA ARCserve Replication and High Availability", by CA, Copyright 2010.*
Article entitled "CA ARCserve RHA and CA ARCserve D2D Integrated Solutions Guide", by CA, Copyright 2011.*
Article entitled "Improving System and Data Protection, Recovery and Availability with CA ARCserve r16", by CA, Copyright 2011.*

* cited by examiner

*Primary Examiner* — Mahesh Dwivedi
(74) *Attorney, Agent, or Firm* — Gilliam IP PLLC; Matt Baca

(57) ABSTRACT

A system and method creates a directory snapshot. The method includes retrieving a group of filenames from a directory, splitting the group of filenames into a first plurality of filenames and a second plurality of filenames, and storing the first plurality of filenames into a first temporary snapshot file and storing the second plurality of filenames into a second temporary snapshot file. The filenames in the first and second temporary snapshot files are sorted based on the same heuristic and a sorted linked list that includes a filename listed first in the first temporary snapshot file and a filename listed first in the second temporary snapshot file is created. A first filename from the sorted linked list is saved to a result directory snapshot file.

17 Claims, 4 Drawing Sheets

SYSTEMS AND METHODS FOR DIRECTORY SNAPSHOT

BACKGROUND

Snapshots of directories (e.g., servers, databases, or repositories) can include a list of the filenames in the directory. Snapshots can be useful for figuring which files need to be backed up. When there are a lot of files in a directory creating a snapshot can be prohibitively time consuming.

BRIEF SUMMARY

According to one aspect of the present disclosure, a method of creating a directory snapshot includes retrieving a group of filenames from a directory, splitting the group of filenames into a first plurality of filenames and a second plurality of filenames, and storing the first plurality of filenames into a first temporary snapshot file and storing the second plurality of filenames into a second temporary snapshot file. The filenames in the first and second temporary snapshot files are sorted based on the same heuristic and creating a sorted linked list that includes a filename listed first in the first temporary snapshot file and a filename listed first in the second temporary snapshot file. A first filename from the sorted linked list is saved to a result directory snapshot file.

According to another aspect of the present disclosure, a system for creating a directory snapshot includes one or more processors configured to retrieve a group of filenames, split the group of filenames into a first plurality of filenames and a second plurality of filenames, store the first plurality of filenames into a first temporary snapshot file and store the second plurality of filenames into a second temporary snapshot file, sort the filenames in the first temporary snapshot file based on a heuristic, sort the filenames in the second temporary snapshot file based on the heuristic, create a sorted linked list that includes a filename listed first in the first temporary snapshot file and a filename listed first in the second temporary snapshot file, and save a first filename from the sorted linked list to a result directory snapshot file.

According to yet another aspect of the present disclosure, a computer program product for creating a directory snapshot includes a computer readable storage medium having computer readable program code embodied therewith, the computer program code including computer readable program code configured to retrieve a group of filenames, split the group of filenames into a first plurality of filenames and a second plurality of filenames, store the first plurality of filenames into a first temporary snapshot file and store the second plurality of filenames into a second temporary snapshot file, sort the filenames in the first temporary snapshot file based on a heuristic, sort the filenames in the second temporary snapshot file based on the heuristic, create a sorted linked list that includes a filename listed first in the first temporary snapshot file and a filename listed first in the second temporary snapshot file, and save a first filename from the sorted linked list to a result directory snapshot file.

BRIEF DESCRIPTION OF THE DRAWINGS

Aspects of the present disclosure are illustrated by way of example and are not limited by the accompanying FIGS. with like references indicating like elements.

DETAILED DESCRIPTION

Figure 1:
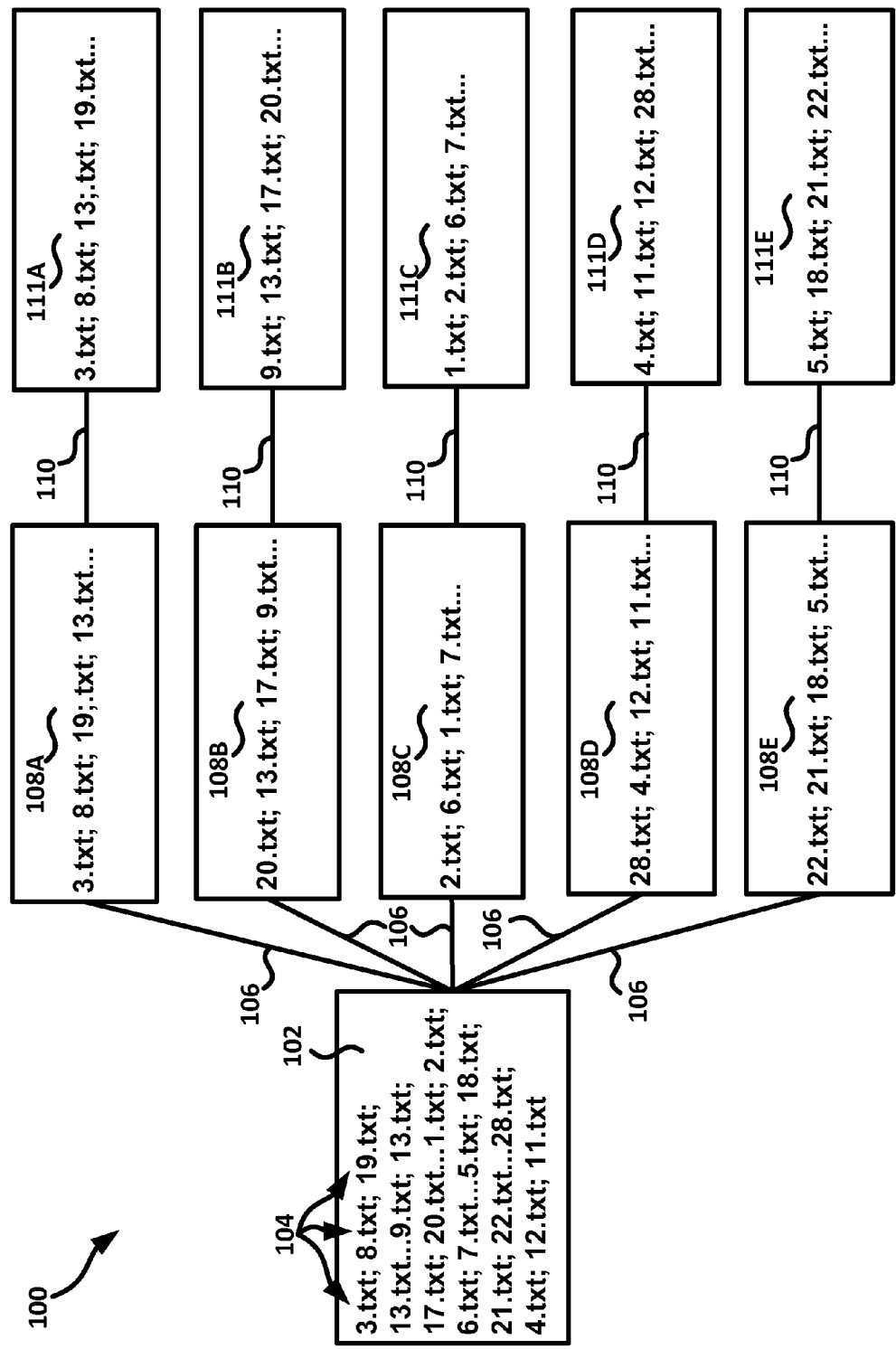
FIG. 1 illustrates a portion of an example of a technique for creating a directory snapshot.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented in entirely hardware, entirely software (including firmware, resident software, micro-code, etc.) or in a combination of software and hardware that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of techniques, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Efficiently comparing a directory snapshot of an active server to a directory snapshot of a backup server can include sorting the files, filenames, or other file information (e.g., metadata of the files) of the active directory and the backup server using the same heuristic. That is, by sorting the directory snapshot of the active server and the directory snapshot backup server in the same manner, it can be determined whether the backup server includes a file relatively quick. However, sorting the filenames in a directory snapshot can be quite time consuming, especially when a large number of filenames (e.g., tens of thousands, hundreds of thousands, millions, or more) are to be sorted. The sorting can consume a lot of I/O (input/output) or can also take up a lot of space in memory, depending on where the sort is being carried out. If the filenames, for example, are sorted in memory, the sort can affect an application running on a server by affecting access to memory. If the filenames are sorted on one or more disks, the sort can affect applications running thereon by using a lot of I/O through performing a lot of operations. These processes can also take a lot of time.

Using some server software, such as Computer Associates' (CA) ARCserve® Replication and High Availability (RHA) software, it can be advantageous to know what files to send to a backup server before backing up an active server. This can be accomplished by creating a snapshot; including retrieving the filenames and optionally retrieving corresponding file metadata, such as file size and timestamp, from the active server. The filenames on the snapshot can be sorted as a function of a heuristic. The same thing can be done for the backup server, and the two lists can be compared. Since all of the filenames on both servers have been retrieved and sorted in the same manner, the lists can be easily compared to discover what, if anything, should be backed up.

If there is a file listed on the active server snapshot but not on the backup server snapshot then that file should be backed up. If a filename on the active server snapshot is also on the backup server snapshot, it is not a guarantee that the file on the backup server is the same as the file on the active server. In such cases the file size or timestamp of the relevant files on the active server and the backup server can be compared to determine if file should be backed up. For example, when a filename on the active server list has a matching filename on the backup server list and the file sizes of those two file are different, then the file on the active server is different than the file on the backup server. If the file size of the file on the active server is greater than the file size of the file of the file on the backup server, than the file likely includes additions and the file on the backup server can be replaced with the corresponding file on the active server. If the file size on the backup server is greater than the file size of the file on the active server, than the file may be a different file with the same name and the server can save the file from the active server to the backup server as a new instance of the file.

An advantage of one or methods discussed herein can include increasing efficiency in sorting a large number of files. Another advantage can include using less memory to accomplish the sort. Yet another advantage can include using fewer disks I/O to accomplish the sort.

Figure 2:
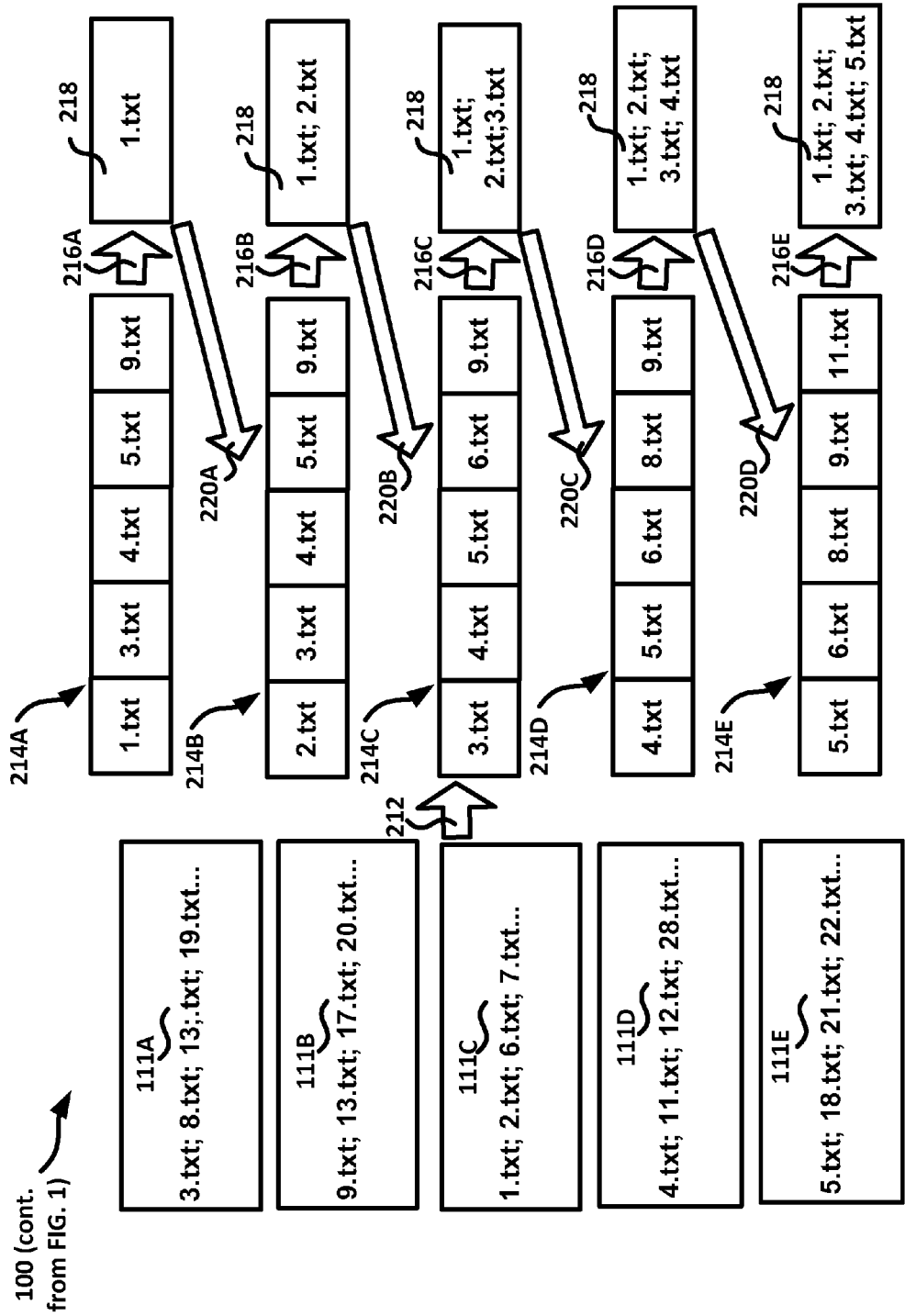
FIG. 2 illustrates another portion of an example of a technique for creating a directory snapshot.

FIG. 1 and FIG. 2 depict portions of an example of a technique 100 for creating a snapshot of a directory 102. The directory 102 can be a database, a memory, such as a disk, disc, or solid-state memory, or other medium capable of storing filenames 104. At least some of the filenames 104 of files on the directory can be retrieved. At 106, the filenames 104 that were retrieved can be split and stored on two or more temporary snapshot files 108A, 108B, 108C, 108D, or 108E. The temporary snapshot files 108A-E can each include about the same number of filenames 104. The temporary snapshot files 108A-E can include differing numbers of filenames 104.

In one or more embodiments, the directory 102 can include a number of files (N) with corresponding filenames 104. A specified number (n) of the N filenames 104 in the directory 102 can be retrieved (e.g., randomly retrieved) from the directory 102 and saved to the first temporary snapshot file 108A. If n or more filenames 104 remain to be retrieved from the directory 102, then the next n filenames 104 can be retrieved from the directory 102 and saved to the second temporary snapshot file 108B. This process can be repeated until all N filenames 104 have been retrieved and saved to a temporary snapshot file 108A, 108B, 108C, 108D, or 108E. The last temporary snapshot file 108E that has files saved to it can include fewer filenames 104 than the rest of the temporary snapshot files 108A, 108B, 108C, and 108D. In other embodiments, the filenames 104 can all be retrieved simultaneously or distributed randomly amongst a number of temporary snapshot files 108A, 108B, 108C, 108D, or 108E. The temporary snapshot files 108A, 108B, 108C, 108D, and 108E can include differing numbers of filenames 104 stored thereon.

More than just the filenames 104 can be retrieved from the directory 102. A timestamp (e.g., creation date, date of last modification, or the like), file size, file type, or other metadata can be retrieved with the filenames 104 when the filenames 104 include such corresponding information.

At 110, the filenames 104 in each of the temporary snapshot files 108A, 108B, 108C, 108D, and 108E can be organized (e.g., sorted) based on a heuristic. Such sorting can create sorted temporary snapshot files 111A, 111B, 111C, 111D, and 111E, respectively. The heuristic can be numerical order, alphabetical order, filename length, file size, timestamp, or a combination thereof, among others. In the example shown in FIG. 1, the heuristic used to sort the temporary snapshot files 108A, 108B, 108C, 108D, and 108E is alphabetical order, numerical order, filename length, or a combination thereof.

FIG. 2 shows a portion of a technique 100 for creating a snapshot of a directory 102. At 212, a sorted linked list 214A can be created. To begin, the sorted linked list 214A can include the first filename 104 listed in each of the sorted temporary snapshot files 111A, 111B, 111C, 111D, and 111E. In the example shown in FIG. 2, the sorted linked list 214A includes the filename 104 "1.txt", which corresponds to the first filename 104 listed in the temporary snapshot file 111C, "3.txt", which corresponds to the first filename 104 listed in the temporary snapshot file 111A, "4.txt", which corresponds to the first filename 104 listed in temporary snapshot file 111D, "5.txt", which corresponds to the first filename 104 listed in temporary snapshot file 111E, and "9.txt", which corresponds to the first filename listed in temporary snapshot file 111B. The filenames 104 in the sorted linked list 214A can be sorted based on the same heuristic used to sort the filenames in the sorted temporary snapshot files 111A, 111B, 111C, 111D, and 111E.

At 216A, the first filename 104 listed in the sorted linked list 214A can be saved to a result snapshot directory 218. In the example shown in FIG. 2, the first filename 104 listed in the sorted linked list 214A is "1.txt". At 220A, the filename 104 that was saved to the result snapshot directory 218 (e.g., "1.txt" in this example) can be removed from the sorted linked list 214A and replaced with the next filename 104 from the temporary snapshot file 111A, 111B, 111C, 111D, or 111E that included the filename 104 that was last saved to the result snapshot directory 218. In the example shown in FIG. 2, "1.txt" (the last filename 104 that was saved to the result snapshot directory 218) was from the temporary snapshot file 111C. The filename 104 that is listed after "1.txt" in temporary snapshot file 111C is "2.txt". "2.txt" can be added to the sorted linked list 214B in place of "1.txt" and the sorted linked list 214B can be sorted as a function of the heuristic.

At 216B, the first filename 104 listed in the sorted linked list 214B can be saved to the result snapshot directory 218. At 220B, the filename 104 that was saved to the result snapshot directory 218 (e.g., "2.txt" in this example) can be removed from the sorted linked list 214B and replaced with the next filename 104 from the temporary snapshot file 111C that includes the filename 104 that was last saved to the result snapshot directory 218. In the example shown in FIG. 2, "2.txt" (the last filename 104 that was saved to the result snapshot directory 218) was from the temporary snapshot file 111C. The filename 104 that is listed after "2.txt" in temporary snapshot file 111C is "6.txt". "6.txt" can be added to the sorted linked list 214B in place of "2.txt" and the sorted linked list 214C can be sorted as a function of the heuristic.

At 216C, the first filename 104 listed in the sorted linked list 214C can be saved to the result snapshot directory 218. At 220C, the filename 104 that was saved to the result snapshot directory 218 (e.g., "3.txt" in this example) can be removed from the sorted linked list 214C and replaced with the next filename 104 from the temporary snapshot file 111A that includes the filename 104 that was last saved to the result snapshot directory 218. In the example shown in FIG. 2, "3.txt" (the last filename 104 that was saved to the result snapshot directory 218) was from the temporary snapshot file 111A. The filename 104 that is listed after "3.txt" in temporary snapshot file 111C is "8.txt". "8.txt" can be added to the sorted linked list 214C in place of "2.txt" and the sorted linked list 214D can be sorted as a function of the heuristic.

At 216D, the first filename 104 listed in the sorted linked list 214D can be saved to the result snapshot directory 218. At 220D, the last filename 104 that was saved to the result snapshot directory 218 (e.g., "4.txt" in this example) can be removed from the sorted linked list 214D and replaced with the next filename 104 from the temporary snapshot file 111D that includes the filename 104 that was last saved to the result snapshot directory 218. In the example shown in FIG. 2, "4.txt" (the last filename 104 that was saved to the result snapshot directory 218) was from the temporary snapshot file 111D. The filename 104 that is listed after "4.txt" in temporary snapshot file 111D is "11.txt". "11.txt" can be added to the sorted linked list 214D in place of "4.txt" and the sorted linked list 214E can be sorted as a function of the heuristic. At 216D, the first filename 104 listed in the sorted linked list 214D ("5.txt" in this example) can be saved to the result snapshot directory 218. This process can continue until retrieved filenames 104 are saved or stored in the result snapshot directory 218. The final result snapshot directory 218 can include the retrieved filenames 104 listed in order, as a function of the heuristic.

Figure 3:
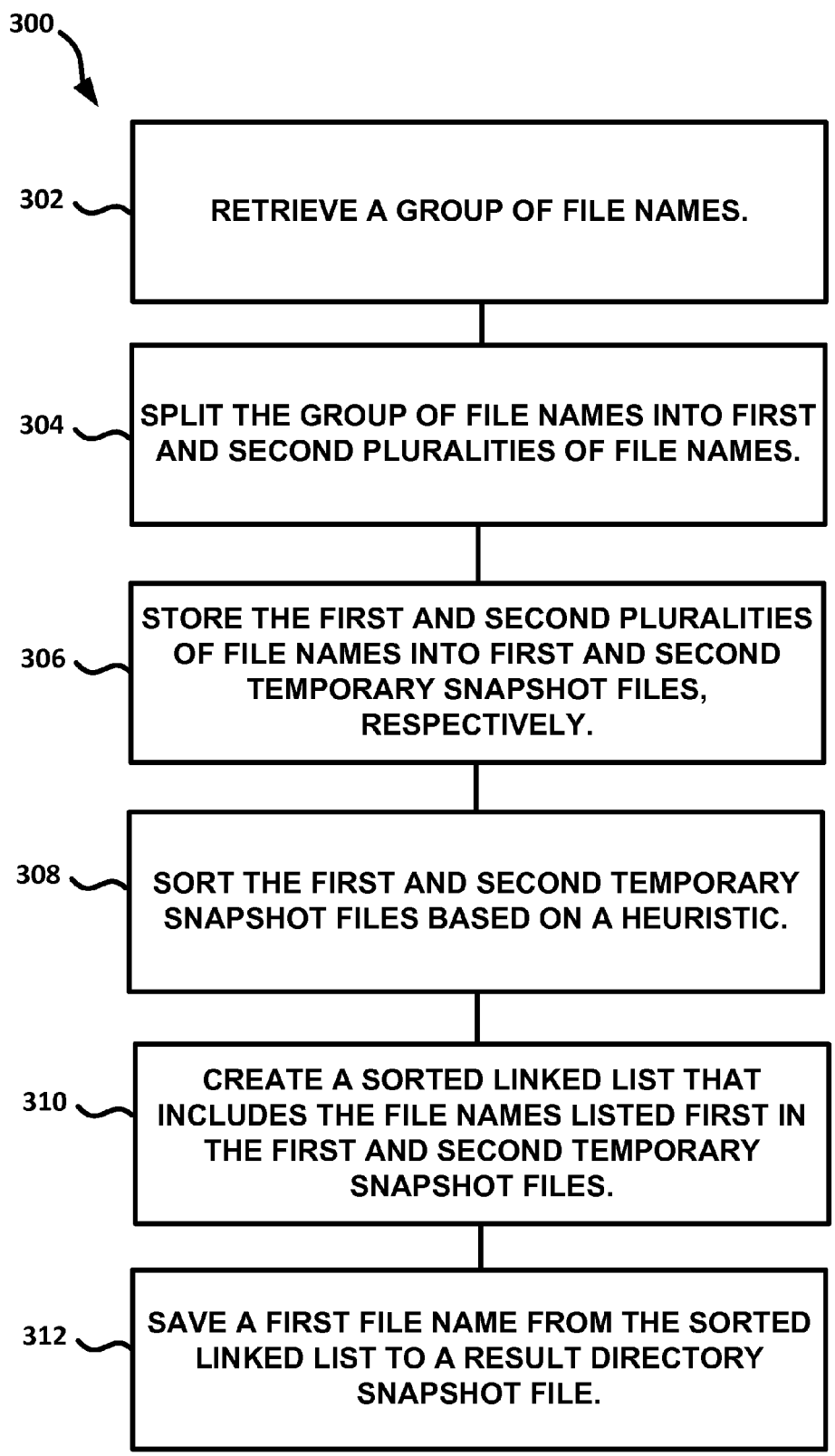
FIG. 3 illustrates an example of a technique for creating a directory snapshot.

FIG. 3 shows a flow diagram of an example of a technique 300 for creating a snapshot of a directory 102. At 302, a group of filenames 104 can be retrieved, such as from a directory 102 (e.g., a memory, such as a server memory, a database memory, or a repository). At 304, the group of filenames 104 that was retrieved can be split into, at least, first and second pluralities of filenames 104. At 306, the first and second pluralities of filenames 104 can be stored, at least temporarily, into first and second temporary snapshot files 108A-B, respectively. At 308, the filenames 104 in the first and second temporary snapshot files 108A-B can be sorted as a function of (e.g., based on) a heuristic, so as to create sorted temporary snapshot files 111A-B. At 310, a sorted linked list 214 that includes the filenames 104 listed first in each of the first and second sorted temporary snapshot files 111A-B can be created. The sorted linked list 214 can be sorted as a function of the heuristic. At 312, first filename 104 listed first or last in the sorted linked list 214 can be saved to a result snapshot directory 218. The filename 104 that was last saved to the sorted linked list 214 can be removed therefrom. In one or more embodiments, the next filename 104 in the temporary snapshot file 111A that includes the filename 104 that was last saved to the result snapshot directory 218 can be added to the sorted linked list 214. In one or more embodiments, the filename 104 that was last saved to the result snapshot directory 218 can be removed from the temporary snapshot file 111A that includes that filename 104. The first or the next filename 104 listed in that temporary snapshot file 111A can be added to the sorted linked list 214. The technique can repeat from 312 until the filenames 104 that were retrieved at 302 are stored in the directory 102.

Figure 4:
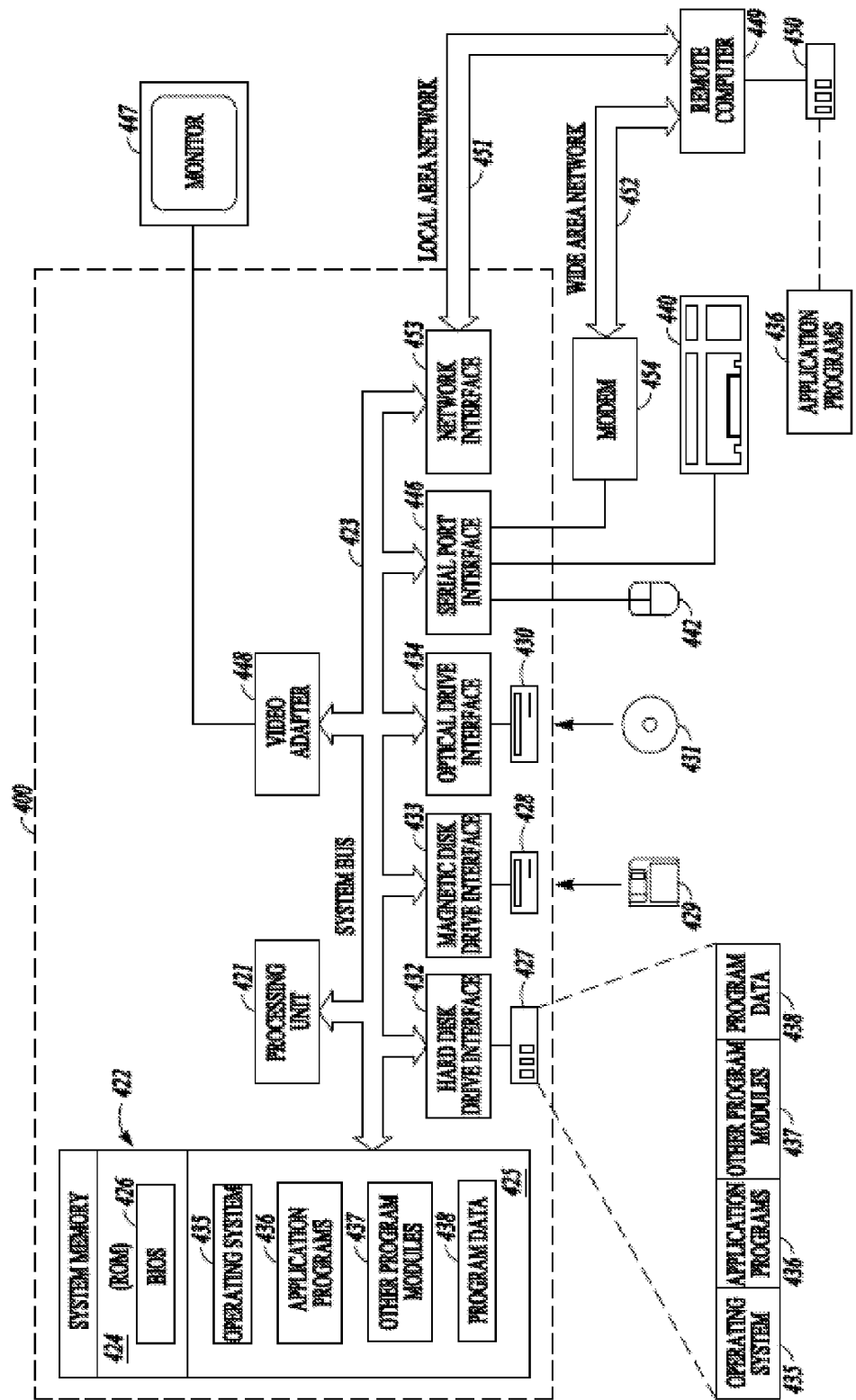
FIG. 4 illustrates an example of a computer system to implement techniques.

FIG. 4 shows a block diagram of an example of a computer system to implement various embodiments. In the embodiment shown in FIG. 4, a hardware and operating environment is provided that is applicable to any of the embodiments described.

As shown in FIG. 4, the hardware and operating environment can include a general purpose computing device in the form of a computer 400 (e.g., a personal computer, workstation, or server), including one or more processing units 421, a system memory 422, or a system bus 423 that operatively couples various system components including the system memory 422 to the processing unit 421. There can be one or more one processing units 421, such that the processor of computer 400 comprises a single CPU, or a plurality of processing units, commonly referred to as a multiprocessor or parallel-processor environment. In one or more embodiments, computer 400 is a conventional computer, a distributed computer, or any other type of computer.

The system bus 423 can be any of several types of bus structures including a memory bus or memory controller, a peripheral bus, and a local bus using any of a variety of bus architectures. The system memory can also be referred to as simply the memory, and, in some embodiments, includes read-only memory (ROM) 424 and random-access memory (RAM) 425. A basic input/output system (BIOS) program 426, containing the basic routines that help to transfer information between elements within the computer 400, such as during start-up, can be stored in ROM 424. The computer 400 can further include a hard disk drive 427 for reading from and writing to a hard disk, not shown, a magnetic disk drive 428 for reading from or writing to a removable magnetic disk 429, and an optical disk drive 430 for reading from or writing to a removable optical disk 431 such as a CD ROM or other optical media.

The hard disk drive 427, magnetic disk drive 428, and optical disk drive 430 can couple with a hard disk drive interface 432, a magnetic disk drive interface 433, or an optical disk drive interface 434, respectively. The drives and their associated computer-readable media provide non-volatile storage of computer-readable instructions, data structures, program modules and other data for the computer 400. Any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the operating environment.

A plurality of program modules can be stored on the hard disk, magnetic disk 429, optical disk 431, ROM 424, or RAM 425, including an operating system 435, one or more application programs 436, other program modules 437, and program data 438. Programming for implementing one or more processes or method described herein can be resident on any one or number of these computer-readable media.

A user can enter commands and information into computer 400 through input devices such as a keyboard 440 and pointing device 442. Other input devices (not shown) can include a microphone, joystick, game pad, satellite dish, scanner, or the like. These other input devices are often connected to the processing unit 421 through a serial port interface 446 that is coupled to the system bus 423, but can be connected by other interfaces, such as a parallel port, game port, or a universal serial bus (USB). A monitor 447 or other type of display device can be connected to the system bus 423 via an interface, such as a video adapter 548. The monitor 447 can display a graphical user interface for the user. In addition to the monitor 447, computers typically include other peripheral output devices (not shown), such as speakers and printers.

The computer 400 can operate in a networked environment using logical connections to one or more remote computers or servers, such as remote computer 449. These logical connections through a communication device coupled to or a part of the computer 400; not limited to a particular type of communications device. The remote computer 449 can be another computer, a server, a router, a network PC, a client, a peer device or other common network node, and typically includes many or all of the elements described above relative to the computer 400. The logical connections depicted in FIG. 4 can include a local area network (LAN) 451 and/or a wide area network (WAN) 452. Such networking environments are commonplace in office networks, enterprise-wide computer networks, intranets and the internet, which are all types of networks.

When used in a LAN-networking environment, the computer 400 can be connected to the LAN 451 through a network interface or adapter 453, which is one type of communications device. In one or more embodiments, when used in a WAN-networking environment, the computer 400 can include a modem 454 (another type of communications device) or any other type of communications device (e.g., a wireless transceiver), for establishing communications over the wide-area network 452, such as the internet. The modem 454, which can be internal or external, is connected to the system bus 423 via the serial port interface 446. In a networked environment, program modules depicted relative to the computer 400 can be stored in the remote memory storage device 450 of remote computer 449. The network connections shown are examples of network connections and other means of, and communications devices for, establishing a communications link between the computers can be used including hybrid fiber-coax connections, T1-T3 lines, DSL's, OC-3 and/or OC-12, TCP/IP, microwave, wireless application protocol, and any other electronic media through any suitable switches, routers, outlets and power lines.

Additional Notes and Examples

In Example 1 a method includes retrieving, using a processor, a group of filenames from a directory.

In Example 2, the method of Example 1 includes splitting the group of filenames into a first plurality of filenames and a second plurality of filenames.

In Example 3, the method of at least one of Examples 1-2 includes storing the first plurality of filenames into a first temporary snapshot file and storing the second plurality of filenames into a second temporary snapshot file.

In Example 4, the method of at least one of Examples 1-3 includes sorting the filenames in the first temporary snapshot file based on a heuristic and sorting the filenames in the second temporary snapshot file based on the heuristic.

In Example 5, the method of at least one of Examples 1-4 includes creating a sorted linked list that includes a filename listed first in the first temporary snapshot file and a filename listed first in the second temporary snapshot file.

In Example 6, the method of at least one of Examples 1-5 includes saving a first filename from the sorted linked list to a result directory snapshot file.

In Example 7, the method of at least one of Examples 1-6 includes removing the first filename from the sorted linked list, wherein the first filename from the sorted linked list is listed in the first temporary snapshot file.

In Example 8, the method of at least one of Examples 1-7 includes adding a second filename listed in the first temporary snapshot file to the sorted linked list.

In Example 9, splitting the group of filenames of at least one of Examples 1-8 includes splitting the group of filenames into the first plurality of filenames and the second plurality of filenames, wherein the first and second plurality of filenames include about the same number of filenames.

In Example 10, sorting the filenames in the first temporary snapshot file of at least one of Examples 1-9 includes sorting the filenames in the first temporary snapshot file in alphabetical order.

In Example 11, the method of at least one of Examples 1-10 includes retrieving the group of filenames includes retrieving at least one million filenames.

In Example 12, retrieving the group of filenames of at least one of Examples 1-11 includes retrieving a timestamp and a file size for each file.

In Example 13 sorting the filenames in the first temporary snapshot file of at least one of Examples 1-12 includes sorting the filenames in the first temporary snapshot file in file size order, smallest file size listed first.

In Example 14 a system includes one or more processors configured to retrieve a group of filenames.

In Example 15, the one or more processors of at least one of Examples 1-14 is configured to split the group of filenames into a first plurality of filenames and a second plurality of filenames.

In Example 16, the one or more processors of at least one of Examples 1-15 is configured to store the first plurality of filenames into a first temporary snapshot file and store the second plurality of filenames into a second temporary snapshot file.

In Example 17, the one or more processors of at least one of Examples 1-16 is configured to sort the filenames in the first temporary snapshot file based on a heuristic.

In Example 18, the one or more processors of at least one of Examples 1-17 is configured to sort the filenames in the second temporary snapshot file based on the heuristic;

In Example 19, the one or more processors of at least one of Examples 1-18 is configured to create a sorted linked list that includes a filename listed first in the first temporary snapshot file and a filename listed first in the second temporary snapshot file.

In Example 20, the one or more processors of at least one of Examples 1-19 is configured to save a first filename from the sorted linked list to a result directory snapshot file.

In Example 21, the one or more processors of at least one of Examples 1-20 is configured to remove the first filename from the sorted linked list, wherein the first filename from the sorted linked list is listed in the first temporary snapshot file.

In Example 22, the one or more processors of at least one of Examples 1-21 is configured to add a second filename listed in the first temporary snapshot file to the sorted linked list.

In Example 23, the first and second plurality of filenames of at least one of Examples 1-22 include about the same number of filenames.

In Example 24, the heuristic of at least one of Examples 1-23 is alphabetical order.

In Example 25, the one or more processors of at least one of Examples 1-24 is configured to retrieve at least one million filenames.

In Example 26, the one or more processors of at least one of Examples 1-25 is configured to retrieve the group of filenames includes retrieving a timestamp and a file size for each filename in the group of filenames when the filename has an associated timestamp and file size.

In Example 27, the heuristic of at least one of Examples 1-26 is smallest file size first.

In Example 28 a computer program product includes a computer readable storage medium having computer readable program code embodied therewith, the computer program code comprising computer readable program code configured to retrieve a group of filenames.

In Example 29, the computer readable program code of at least one of Examples 1-28 is configured to split the group of filenames into a first plurality of filenames and a second plurality of filenames.

In Example 30, the computer readable program code of at least one of Examples 1-29 is configured to store the first plurality of filenames into a first temporary snapshot file and store the second plurality of filenames into a second temporary snapshot file.

In Example 31, the computer readable program code of at least one of Examples 1-30 is configured to sort the filenames in the first temporary snapshot file based on a heuristic.

In Example 32, the computer readable program code of at least one of Examples 1-31 is configured to sort the filenames in the second temporary snapshot file based on the heuristic.

In Example 33, the computer readable program code of at least one of Examples 1-32 is configured to create a sorted linked list that includes a filename listed first in the first temporary snapshot file and a filename listed first in the second temporary snapshot file.

In Example 34, the computer readable program code of at least one of Examples 1-33 is configured to save a first filename from the sorted linked list to a result directory snapshot file.

In Example 35, the computer readable program code of at least one of Examples 1-34 is configured to remove the first filename from the sorted linked list, wherein the first filename from the sorted linked list is listed in the first temporary snapshot file.

In Example 36, the computer readable program code of at least one of Examples 1-35 is configured to add a second filename listed in the first temporary snapshot file to the sorted linked list.

In Example 37, the program code configured to split the group of filenames of at least one of Examples 1-36 includes program code configured to split the group of filenames into the first plurality of filenames and the second plurality of filenames, wherein the first and second plurality of filenames include about the same number of filenames.

In Example 38, the program code configured to sort the filenames in the first temporary snapshot file of at least one of Examples 1-37 includes program code configured to sort the filenames in alphabetical order.

In Example 39, the computer readable program code of at least one of Examples 1-38 includes computer readable program code configured to: retrieve the group of filenames includes retrieving a timestamp and a file size for each filename in the group of filenames when the filename has an associated timestamp and file size.

In Example 40, the program code configured to sort the filenames in the first temporary snapshot file of at least one of Examples 1-39 includes program code configured to sort the filenames in the first temporary snapshot file in file size order, smallest file size listed first.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising: retrieving, using a processor, a first group of filenames from a first directory and a second group of filenames from a backup directory of the first directory; storing the first group of filenames into a first temporary snapshot file; storing the second group of filenames into a second temporary snapshot file; sorting the filenames in the first temporary snapshot file based on a heuristic; sorting the filenames in the second temporary snapshot file based on the heuristic; comparing the sorted filename entries in the first temporary snapshot file with the sorted filename entries in the second temporary snapshot file; and based on said comparing, creating a sorted linked list that includes a filename listed first in the first temporary snapshot file and a filename listed first in the second temporary snapshot file; saving a first filename from the sorted linked list to a result directory snapshot file; removing the first filename from the sorted linked list, wherein the first filename from the sorted linked list is listed in the first temporary snapshot file; and adding a second filename listed in the first temporary snapshot file to the sorted linked list.

2. The method of claim 1, wherein splitting the group of filenames includes splitting the group of filenames into the first plurality of filenames and the second plurality of filenames, wherein the first and second plurality of filenames include about the same number of filenames.

3. The method of claim 1, wherein sorting the filenames in the first temporary snapshot file includes sorting the filenames in the first temporary snapshot file in alphabetical order.

4. The method of claim 1, wherein retrieving the group of filenames includes retrieving at least one million filenames.

5. The method of claim 1, wherein retrieving the group of filenames includes retrieving a timestamp and a file size for each file.

6. The method of claim 5, wherein sorting the filenames in the first temporary snapshot file includes sorting the filenames in the first temporary snapshot file in file size order, smallest file size listed first.

7. A system comprising: one or more processors configured to: retrieve a first group of filenames from a first directory and a second group of filenames from a backup directory of the first directory; store the first group of filenames into a first temporary snapshot file and store the second group of filenames into a second temporary snapshot file; sort the filenames in the first temporary snapshot file based on a heuristic; sort the filenames in the second temporary snapshot file based on the heuristic; compare the sorted filename entries in the first temporary snapshot file with the sorted filename entries in the second temporary snapshot file; and based on said comparing, create a sorted linked list that includes a filename listed first in the first temporary snapshot file and a filename listed first in the second temporary snapshot file; and save a first filename from the sorted linked list to a result directory snapshot file; remove the first filename from the sorted linked list, wherein the first filename from the sorted linked list is listed in the first temporary snapshot file; and add a second filename listed in the first temporary snapshot file to the sorted linked list.

8. The system of claim 7, wherein the first and second plurality of filenames include about the same number of filenames.

9. The system of claim 7, wherein the heuristic is alphabetical order.

10. The system of claim 7, wherein at least one million filenames are retrieved.

11. The system of claim 7, wherein the one or more processors are further configured to retrieve the group of filenames includes retrieving a timestamp and a file size for each filename in the group of filenames when the filename has an associated timestamp and associated file size.

12. The system of claim 11, wherein the heuristic is smallest file size first.

13. A computer program product comprising: a computer readable storage medium having computer readable program code embodied therewith, the computer program code comprising: computer readable program code configured to: retrieve a first group of filenames from a first directory and a second group of filenames from a backup directory of the first directory; store the first group of filenames into a first temporary snapshot file and store the second group of filenames into a second temporary snapshot file; sort the filenames in the first temporary snapshot file based on a heuristic; sort the filenames in the second temporary snapshot file based on the heuristic; compare the sorted filename entries in the first temporary snapshot file with the sorted filename entries in the second temporary snapshot file; and based on said comparing, create a sorted linked list that includes a filename listed first in the first temporary snapshot file and a filename listed first in the second temporary snapshot file; save a first filename from the sorted linked list to a result directory snapshot file; remove the first filename from the sorted linked list, wherein the first filename from the sorted linked list is listed in the first temporary snapshot file; and add a second filename listed in the first temporary snapshot file to the sorted linked list.

14. The computer program product of claim 13, wherein the program code configured to split the group of filenames include program code configured to split the group of filenames into the first plurality of filenames and the second plurality of filenames, wherein the first and second plurality of filenames include about the same number of filenames.

15. The computer program product of claim 13, wherein the program code configured to sort the filenames in the first temporary snapshot file includes program code configured to sort the filenames in alphabetical order.

16. The computer program product of claim 13, wherein the computer readable storage medium further comprises computer readable program code configured to:
retrieve the group of filenames includes retrieving a timestamp and a file size for each filename in the group of filenames when the filename has an associated timestamp and associated file size.

17. The computer program product of claim 16, wherein the program code configured to sort the filenames in the first temporary snapshot file includes program code configured to sort the filenames in the first temporary snapshot file in file size order, smallest file size listed first.

* * * * *